United States Patent
Katayama et al.

(10) Patent No.: US 9,802,444 B2
(45) Date of Patent: Oct. 31, 2017

(54) PNEUMATIC TIRE

(71) Applicant: BRIDGESTONE CORPORATION, Tokyo (JP)

(72) Inventors: Shinsaku Katayama, Kodaira (JP); Eisuke Seta, Kodaira (JP); Yoshio Kaji, Kodaira (JP); Masafumi Koide, Kodaira (JP); Takayuki Kurata, Kodaira (JP); Hiroyuki Katsuno, Kodaira (JP); Masakazu Amano, Kodaira (JP); Ataka Takei, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 263 days.

(21) Appl. No.: 14/648,563

(22) PCT Filed: Nov. 28, 2013

(86) PCT No.: PCT/JP2013/082077
§ 371 (c)(1),
(2) Date: May 29, 2015

(87) PCT Pub. No.: WO2014/084320
PCT Pub. Date: Jun. 5, 2014

(65) Prior Publication Data
US 2015/0321518 A1 Nov. 12, 2015

(30) Foreign Application Priority Data

Nov. 30, 2012 (JP) ................................. 2012-263794

(51) Int. Cl.
*B60C 11/12* (2006.01)
*B60C 11/04* (2006.01)
(Continued)

(52) U.S. Cl.
CPC .......... *B60C 11/04* (2013.01); *B60C 11/0302* (2013.01); *B60C 11/0309* (2013.01);
(Continued)

(58) Field of Classification Search
CPC ............... B60C 11/0302; B60C 11/033; B60C 11/0332; B60C 11/1315; B60C 11/1323; B60C 11/1236
See application file for complete search history.

(56) References Cited

U.S. PATENT DOCUMENTS 5,814,169 A * 9/1998 Yamaguchi ............. B60C 11/11
152/209.2
6,527,024 B1 * 3/2003 Ashmore ............ B60C 11/0316
152/209.22

(Continued)

FOREIGN PATENT DOCUMENTS

DE 197 05 156 A1 10/1997
DE 10311430 * 9/2004
(Continued)

OTHER PUBLICATIONS

English machine translation of KR10-0902393, no date.*
(Continued)

*Primary Examiner* — Michael H Wilson
*Assistant Examiner* — Robert Dye
(74) *Attorney, Agent, or Firm* — Sughrue Mion, PLLC

(57) ABSTRACT

A pneumatic tire (10) has, in the surface of the tread (11), a central circumferential groove (12) located at the center of the contact patch width and extending circumferentially around the tire, a plurality of longitudinal grooves (13 (13*a*, 13*b*)) formed on the axially outside of the central circumferential groove (12), lug grooves (15), and blocks (16 (16*a* to 16*c*)) defined by the central circumferential groove (12), the longitudinal grooves (13), and the lug grooves (15). Each
(Continued)

of the lug grooves (15) is formed such that its width in the shoulder region is greater than its width in the central region, and the sum of the groove area of the central circumferential groove (12) and the groove area of the longitudinal grooves (13) is smaller than the area of the lug grooves (15). As a result, the pneumatic tire (10) not only secures the wet braking performance and wear resistance performance on paved roads, but also improves the acceleration performance and braking performance and the steering stability performance on snowy roads.

12 Claims, 6 Drawing Sheets

(51) Int. Cl.
    *B60C 11/13*     (2006.01)
    *B60C 11/11*     (2006.01)
    *B60C 11/03*     (2006.01)
(52) U.S. Cl.
    CPC ............... *B60C 11/11* (2013.01); *B60C 11/12* (2013.01); *B60C 11/1236* (2013.01); *B60C 11/13* (2013.01); *B60C 11/1369* (2013.01); *B60C 11/0332* (2013.01); *B60C 2011/0341* (2013.01); *B60C 2011/0344* (2013.01); *B60C 2011/0346* (2013.01); *B60C 2011/0365* (2013.01); *B60C 2011/0369* (2013.01); *B60C 2011/0393* (2013.01); *B60C 2011/1213* (2013.01); *B60C 2011/1268* (2013.01)

(56) References Cited

U.S. PATENT DOCUMENTS

2004/0221936 A1* 11/2004 Kaiser ........................ B60C 1/00
    152/209.1
2005/0016656 A1* 1/2005 Kuroki .................... B60C 11/00
    152/548
2009/0078351 A1* 3/2009 Ebiko ..................... B60C 11/12
    152/209.23

FOREIGN PATENT DOCUMENTS

| | | | |
|---|---|---|---|
| DE | 102007061148 | * | 6/2009 |
| EP | 062989 | * | 6/1994 |
| EP | 1 106 394 A2 | | 6/2001 |
| JP | 5-301508 A | | 11/1993 |
| JP | 09-226323 | * | 9/1997 |
| JP | 11-263104 A | | 9/1999 |
| JP | 2000-225812 A | | 8/2000 |
| JP | 2001-55019 A | | 2/2001 |
| JP | 2001-225611 A | | 8/2001 |
| JP | 4325948 B2 | | 9/2009 |
| JP | 2010-254155 A | | 11/2010 |
| JP | 2011-251614 A | | 12/2011 |
| KR | 10-0902393 | * | 6/2009 |

OTHER PUBLICATIONS

English machine translation of DE10311430, no date.*
English machine translation of JP09-226323, no date.*
International Preliminary Report on Patentability dated Jun. 11, 2015, issued by the International Bureau of WIPO in counterpart International Application No. PCT/JP2013/082077.
International Search Report of PCT/JP2013/082077 dated Jan. 28, 2014.
Communication dated Jul. 28, 2016, from the European Patent Office in counterpart European application No. 13858920.5.

* cited by examiner

FIG. 8

| | ACCELERATION PERFORMANCE ON THE SNOW | STEERING STABILITY PERFORMANCE ON THE SNOW | WET BRAKING PERFORMANCE | WEAR RESISTANCE PERFORMANCE |
|---|---|---|---|---|
| CONVENTIONAL EXAMPLE 1 | 100 | 100 | 100 | 100 |
| COMPARATIVE EXAMPLE 1 | 103 | 103 | 101 | 102 |
| EXANPLE 1 | 104 | 104 | 108 | 104 |
| EXANPLE 2 | 105 | 105 | 109 | 105 |
| EXANPLE 3 | 106 | 106 | 110 | 106 |
| EXANPLE 4 | 107 | 107 | 108 | 107 |
| EXANPLE 5 | 108 | 108 | 100 | 108 |
| EXANPLE 6 | 106 | 104 | 101 | 102 |
| EXANPLE 7 | 106 | 105 | 108 | 105 |
| EXANPLE 8 | 106 | 105 | 109 | 105 |
| EXANPLE 9 | 106 | 102 | 108 | 104 |
| EXANPLE 10 | 105 | 107 | 111 | 105 |
| EXANPLE 12 | 103 | 104 | 108 | 104 |
| COMPARATIVE EXAMPLE 2 | 102 | 102 | 103 | 102 |
| COMPARATIVE EXAMPLE 3 | 108 | 108 | 102 | 102 |
| EXANPLE 13 | 107 | 107 | 106 | 105 |
| EXANPLE 14 | 105 | 105 | 112 | 107 |
| EXANPLE 15 | 104 | 104 | 114 | 108 |
| EXANPLE 16 | 101 | 101 | 116 | 109 |
| EXANPLE 17 | 107 | 108 | 110 | 106 |
| EXANPLE 18 | 109 | 109 | 110 | 106 |
| EXANPLE 19 | 106 | 106 | 104 | 106 |
| EXANPLE 20 | 106 | 106 | 112 | 106 |
| EXANPLE 21 | 106 | 106 | 116 | 106 |
| EXANPLE 22 | 105 | 106 | 117 | 105 |
| EXANPLE 23 | 105 | 106 | 117 | 105 |
| EXANPLE 24 | 103 | 104 | 116 | 112 |
| EXANPLE 25 | 104 | 105 | 115 | 111 |
| EXANPLE 26 | 105 | 106 | 114 | 110 |
| EXANPLE 27 | 106 | 106 | 113 | 109 |

FIG.9

| | ACCELERATION PERFORMANCE ON THE SNOW | STEERING STABILITY PERFORMANCE ON THE SNOW | WET BRAKING PERFORMANCE | WEAR RESISTANCE PERFORMANCE |
|---|---|---|---|---|
| EXANPLE 28 | 106 | 106 | 113 | 109 |
| EXANPLE 29 | 106 | 106 | 113 | 109 |
| EXANPLE 30 | 105 | 106 | 113 | 108 |
| EXANPLE 31 | 104 | 105 | 112 | 107 |
| EXANPLE 32 | 106 | 106 | 113 | 109 |
| EXANPLE 33 | 105 | 106 | 113 | 109 |
| EXANPLE 34 | 104 | 105 | 112 | 107 |
| EXANPLE 35 | 106 | 106 | 110 | 107 |
| EXANPLE 36 | 106 | 106 | 110 | 107 |
| EXANPLE 37 | 106 | 106 | 110 | 108 |
| EXANPLE 38 | 106 | 103 | 108 | 108 |
| EXANPLE 39 | 108 | 103 | 103 | 108 |
| EXANPLE 40 | 107 | 105 | 108 | 107 |
| EXANPLE 41 | 106 | 106 | 110 | 107 |
| EXANPLE 42 | 106 | 106 | 112 | 110 |
| EXANPLE 43 | 105 | 105 | 112 | 110 |
| EXANPLE 44 | 103 | 103 | 111 | 108 |
| EXANPLE 45 | 106 | 106 | 110 | 106 |
| EXANPLE 46 | 106 | 106 | 111 | 106 |
| EXANPLE 47 | 106 | 106 | 112 | 106 |
| EXANPLE 48 | 106 | 106 | 111 | 105 |
| EXANPLE 49 | 106 | 106 | 110 | 104 |
| EXANPLE 50 | 106 | 106 | 113 | 109 |
| EXANPLE 51 | 106 | 106 | 114 | 110 |
| EXANPLE 52 | 105 | 106 | 115 | 111 |
| EXANPLE 53 | 106 | 106 | 109 | 106 |
| EXANPLE 54 | 106 | 106 | 111 | 107 |
| EXANPLE 55 | 106 | 107 | 112 | 105 |

PNEUMATIC TIRE

CROSS REFERENCE TO RELATED APPLICATIONS

This application is a National Stage of International Application No. PCT/JP2013/082077 filed Nov. 28, 2013, claiming priority based on Japanese Patent Application No. 2012-263794, filed Nov. 30, 2012, the contents of all of which are incorporated herein by reference in their entirety.

TECHNICAL FIELD

The present invention relates to a pneumatic tire having circumferential grooves and lug grooves formed in the tread surface and, more particularly, to a pneumatic tire to be fitted on a vehicle to run on snowy or wet roads.

BACKGROUND ART

Conventionally, pneumatic tires for winter use have had finely carved tread pattern and furthermore a plurality of sipes formed in the land portions of the tire tread. In this manner, attempts have been made to improve the acceleration performance, braking performance, and steering stability performance of the tires on snowy roads (see Patent Document 1, for instance).

Also, in addition to these, attempts have been made to improve the steering stability on snowy roads by the use of rubber of small modulus of elasticity (soft rubber) as the tread rubber.

RELATED ART DOCUMENT

Patent Document

Patent Document 1: Japanese Patent No. 4325948

SUMMARY OF THE INVENTION

However, the use of finer tread pattern or an increased number of sipes causes a drop in block rigidity. And this leads to the problems of not only reduced wet braking performance on paved roads but also reduced wear resistance performance resulting from larger deformation of blocks.

Also, the use of a smaller modulus of elasticity causes a drop in block rigidity, presenting the problems of lowered wet braking performance and wear resistance performance on paved roads.

The present invention has been made in view of these conventional problems, and an object thereof is to provide a pneumatic tire that can not only secure the wet braking performance and wear resistance performance on paved roads, but also improve the acceleration performance, braking performance, and steering stability performance on snowy roads.

Means for Solving the Problem

The present invention provides a pneumatic tire having a tread which has lug grooves on one side extending from one axial edge toward the axial center of the tire in such a manner as to intersect with the circumferential direction thereof and lug grooves on the other side extending in a symmetrically opposite direction from the axial center toward the other axial edge thereof. The tread further has a central circumferential groove located at the center of the contact width of the tire and extending circumferentially therearound, a plurality of longitudinal grooves formed axially outside of the central circumferential groove and within the contact surface of the tire, with a plurality of land portions defined by the central circumferential groove, the longitudinal grooves, and the lug grooves or by the longitudinal grooves and the lug grooves, and a plurality of sipes disposed in the land portions. And the width of each of the lug grooves in the shoulder regions is greater than the width thereof in the central region. The central region is the region enclosed by two straight parallel lines each passing through the center between the contact width center and the contact edge of the tire, and the shoulder regions are each the region axially outside of the central region. Also, the sum of the groove area of the central circumferential groove and the groove area of the plurality of longitudinal grooves is smaller than the groove area of the lug grooves.

The groove area meant herein is the groove area in the tread pattern of the tire developed into a plane. Also, when the ratio of the groove area to the total area of the tread pattern is defined as a negative rate (groove area/total pattern area), the relationship between the above-mentioned groove areas is such that "negative rate of lug grooves negative rate of circumferential groove".

It is to be noted that the lug grooves consisting of lug grooves extending diagonally right up and lug grooves extending diagonally left up having their respective axial center side openings in circumferentially staggered positions, as shown in FIG. 1, are also among "lug grooves consisting of lug grooves on one side extending from one axial edge toward the axial center thereof in such a manner as to intersect with the circumferential direction thereof and lug grooves on the other side extending in a symmetrically opposite direction from the axial center toward the other axial edge thereof".

BRIEF DESCRIPTION OF THE DRAWINGS

FIG. 8 is a table showing the results of running tests (Examples 1 to 27).

FIG. 9 is a table showing the results of running tests (Examples 28 to 55).

BEST MODE FOR CARRYING OUT THE INVENTION

Preferred embodiments of the present invention will be described hereinbelow with reference to the accompanying drawings.

Figure 1:
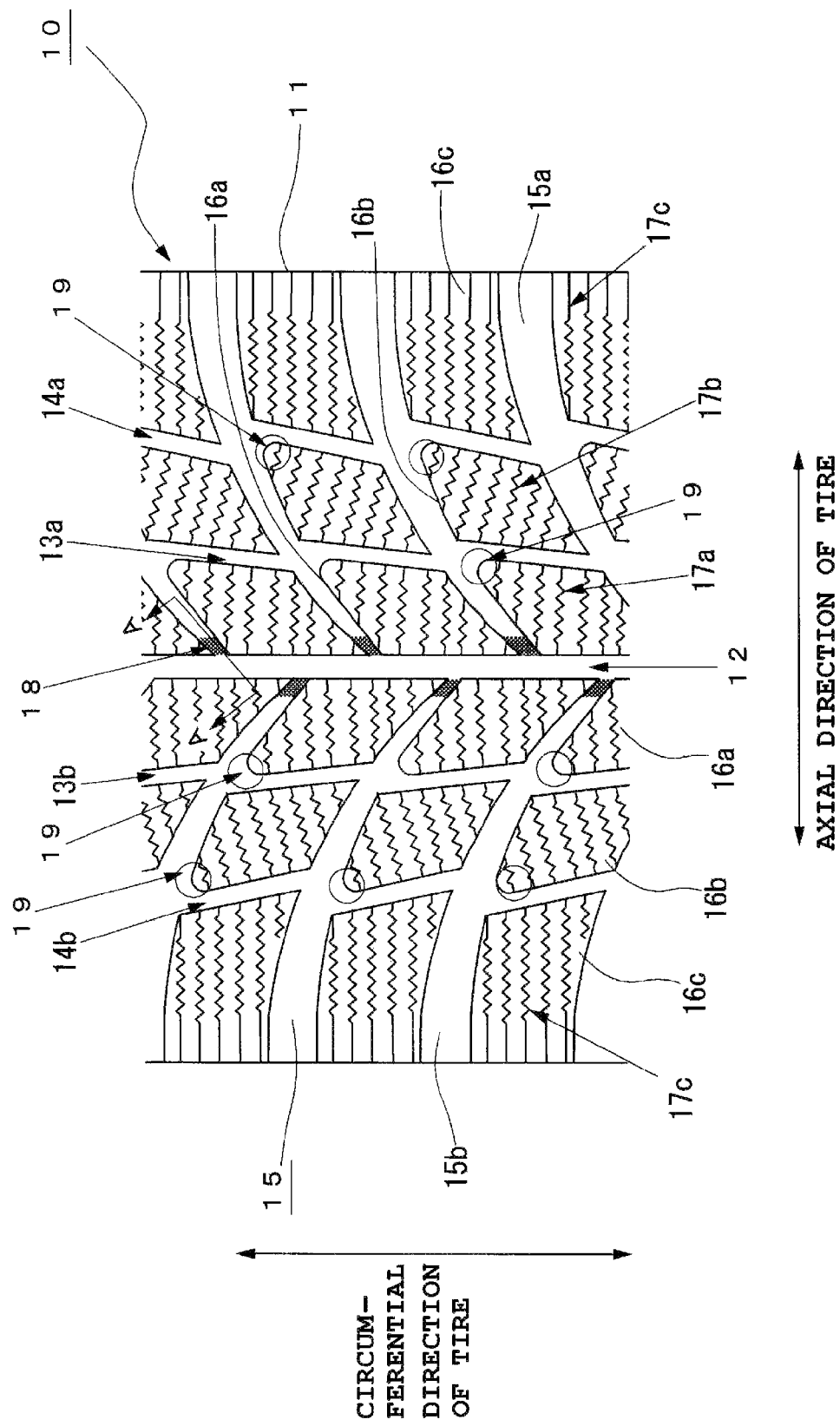
FIG. 1 is an illustration showing a tread pattern of a pneumatic tire according to a preferred embodiment of the present invention.
Figure 2:
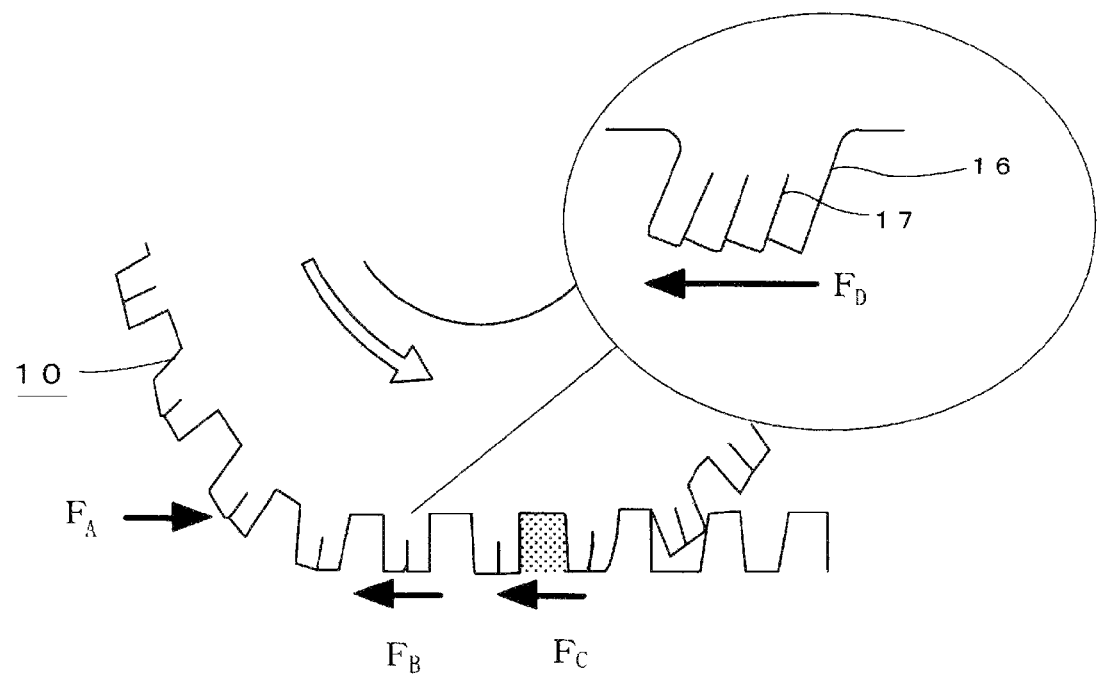
FIG. 2 is illustrations for explaining a mechanism of friction on the snow.

FIG. 1 is an illustration showing an example of a tread pattern of a tread 11 of a pneumatic tire (hereinafter referred to as a tire) 10 according to a preferred embodiment of the present invention. The vertical direction of the illustration is the circumferential direction of the tire, and the horizontal direction the axial direction of the tire.

The tire 10 has at least one layer of carcass toroidally straddling between a pair of beads as the framework. At least one layer of a belt layer is disposed radially outside of the crown part of the carcass. And a tread pattern as shown in FIG. 1 is formed in a surface of tread rubber which is disposed radially outside of the belt layer.

Hereinafter, the region enclosed by two straight parallel lines each passing through the center between the contact width center and the contact edge of the tire will be referred to as the central region, and the regions axially outside of the central region as the shoulder regions.

Formed in a surface of the tread 11 are a central circumferential groove 12, inner longitudinal grooves 13a, 13b and outer longitudinal grooves 14a, 14b, and lug grooves 15.

The central circumferential groove 12 is a circumferential groove disposed substantially at the axial center of the tire and extending continuously along the circumference of the tire.

The inner longitudinal grooves 13a, 13b are longitudinal grooves provided axially outside of the central circumferential groove 12 respectively and extending discontinuously in their approximately circumferential directions. The outer longitudinal grooves 14a, 14b are longitudinal grooves disposed axially outside of the inner longitudinal grooves 13a, 13b respectively and extending discontinuously in their approximately circumferential directions.

The "groove extending continuously" meant here is a groove extending in the circumferential direction of the tire without turning away from it. And the "groove extending discontinuously" meant here is a groove extending obliquely to the circumferential direction of the tire (The angle of the extension of the groove to the circumferential direction of the tire is not 0°).

In the present embodiment, the inner longitudinal grooves 13a, 13b and the outer longitudinal grooves 14a, 14b are each formed about 10° inclined with respect to the circumferential direction of the tire.

The lug grooves 15 are approximately V-shaped grooves consisting of right-side lug grooves 15a, which extend from one axial edge (right side here) toward the axial center of the tire in such a manner as to intersect with the circumferential direction of the tire and opening into the central circumferential groove 12, and left-side lug grooves 15b, which extend from the other axial edge (left side here) toward the axial center of the tire in such a manner as to intersect with the circumferential direction of the tire and opening into the central circumferential groove 12.

The right-side lug grooves 15a and the left-side lug grooves 15b are each an arc-like groove formed such that the groove width is gradually wider axially outward from the central circumferential groove 12. In the pattern shown in FIG. 1, the right-side lug grooves 15a extend diagonally right up from the central circumferential groove 12 toward the axially outer side of the tire, whereas the left-side lug grooves 15b extend diagonally left up.

In the present embodiment, the central circumferential groove 12, the inner longitudinal grooves 13a, 13b, and the outer longitudinal grooves 14a, 14b are all disposed within the contact patch. Also, the central circumferential groove 12 and the inner longitudinal grooves 13a, 13b are disposed in the central region, and the outer longitudinal grooves 14a, 14b in the shoulder regions, respectively. The outer longitudinal grooves 14a, 14b, which are located in the shoulder regions, are also referred to as the shoulder grooves.

Hereinbelow, when no distinction is made between right and left, the inner longitudinal grooves 13a, 13b are referred to as the inner longitudinal grooves 13, and the outer longitudinal grooves 14a, 14b as the outer longitudinal grooves 14.

The surface of the tread 11 is demarcated into a plurality of blocks 16 (16a to 16c) by the central circumferential groove 12, the inner longitudinal grooves 13, the outer longitudinal grooves 14, and the lug grooves 15 provided therein.

The blocks 16a defined by the central circumferential groove 12, the inner longitudinal grooves 13, and the lug grooves 15 and disposed in the central region of the tire 10 are referred to as the central blocks, the blocks 16c defined by the outer longitudinal grooves 14 and the lug grooves 15 and disposed in the shoulder region of the tire 10 as the shoulder blocks, and the blocks 16b defined by the inner longitudinal grooves 13, the outer longitudinal grooves 14, and the lug grooves 15 and disposed between the central blocks 16a and the shoulder blocks 16c as the intermediate blocks.

Provided on the contact patch side, which is the surfaces of the blocks 16a to 16c are pluralities of sipes 17a to 17c, respectively. Hereinbelow, the sipes 17a disposed in the central blocks 16a are referred to as the central sipes, the sipes 17b disposed in the intermediate blocks 16b as the intermediate sipes, and the sipes 17c disposed in the shoulder blocks 16c as the shoulder sipes.

It is to be noted that, in FIG. 1, the reference numeral 18 represents the raised groove bottom portions provided on the bottom of the lug grooves on the center side of the central blocks 16a, and the reference numeral 19 represents the chamfered portions provided on the trailing side of the central blocks 16a and the intermediate blocks 16b.

The μ on the snow, which is the friction coefficient between the tire 10 and the road surface when the vehicle is running on a snowy road surface, is determined mainly by the compression resistance $F_A$ as the running resistance acting on the front of the tire 10, the surface frictional force $F_B$ acting on the surfaces of the blocks 16, the snow column shear force $F_C$ acting on the grooves (lug grooves 15 here), and the scratching force $F_D$ (edge effect) exerted by the sipe edges and block edges.

In the present embodiment, a tread pattern as shown in FIG. 1 is employed to secure the wet braking performance and wear resistance performance and improve the acceleration performance, braking performance and steering stability performance on snowy roads by use of higher μ on the snow.

More specifically, the central circumferential groove 12 is disposed in the center of the central region, and inner longitudinal grooves 13 are disposed in the central region and axially outside of the central circumferential groove 12. This increases lateral grip on the snow by virtue of raised edge effect of the block edges of the central blocks 16a and the intermediate blocks 16b. Also, the central circumferential groove 12 so designed as to be circumferentially continuous around the tire enhances the drainage performance of the tire in the circumferential direction and also secures the wet braking performance.

Also, as already described, the groove width of the lug grooves, in the present embodiment, is so formed as to be gradually wider from the central region toward the shoulder region.

This ensures the block rigidity in the central region by use of a longer block length for the central blocks 16*a*. As a result, it is possible to prevent the collapse of the blocks in the central region. Accordingly, the wet braking performance on paved roads can not only be enhanced, but also the wear resistance performance can be ensured.

In the shoulder region, on the other hand, the wider groove width of the lug grooves 15 secures the fore-aft grip rigidity on the snow by increasing the snow column shear force of the lug grooves 15 which is insufficient in the central region. This improves the acceleration performance on the snow. Also, the groove width of the lug grooves 15, which is gradually wider from the central region to the shoulder region, ensures the wet braking performance by raising the effect of drainage toward the shoulder side.

Thus, in this embodiment, the groove width of the lug grooves wider in the shoulder region than in the central region secures both the fore-aft grip force and snow column shear force on the snow. Accordingly, it is possible not only to secure the wet braking performance on paved roads, but also improve the steering stability performance on snowy road surfaces.

It is to be noted that the lug groove width ratio, which is the ratio of the groove width of the lug grooves 15 in the shoulder region to the groove width thereof in the central region, is preferably 105% to 500%. When the lug groove width ratio is less than 105%, the effect of changing groove width cannot be gained because of the small difference in groove width. Also, when the lug groove width ratio is over 500%, the block rigidity in the shoulder region drops markedly because of too large lug groove width in the shoulder region. As a result, the wet braking performance on paved roads declines.

Also, it is preferable that the inner longitudinal grooves 13 and the outer longitudinal grooves 14 are formed as narrow grooves having the groove width narrower than that of the central circumferential groove 12. Note that the narrow grooves meant here have the groove width wide enough not to allow the groove walls to come in contact with each other within the contact patch. The groove width of the narrow grooves is preferably 20 to 60% of the groove depth. If the groove width of the narrow grooves is less than 20% of the groove depth, then the groove walls may come in contact with each other when lateral forces work. Then the block edge deformation in the lateral direction on the snow will be limited, which may result in a failure to secure the edge effect of the longitudinal grooves. If it is more than 60%, sufficient friction force on the snow or on the wet road surface cannot be obtained due to reduced ground contact area. In an ordinary setting, the groove width of the narrow grooves is preferably 1.5 to 5.5 mm and more preferably 3.0 to 4.5 mm.

Also, it is of primary importance that the sum of the areas of the central circumferential groove 12 and the inner longitudinal grooves 13, which are circumferential grooves, is smaller than the total area of the lug grooves 15, which are lateral grooves. This leads to a larger ratio of the lug grooves 15 when compared with the tire having a conventional tread pattern of the same negative rate (groove area ratio). That is, the fore-aft force on the snow can be secured effectively because of the enlarged area of the lug grooves without raising the negative rate (groove area ratio). Also, location of the inner longitudinal grooves 13 closer to the center can realize a concentration of the longitudinal grooves in the middle of the contact patch. As a result, the effect of the longitudinal grooves can be secured even when the contact patch shape is small under light load.

With ordinary FF (front engine front drive) vehicles, the rear load is smaller than the front load. Also, improved lateral grip in the rear is known to enhance the stability factor, thereby improving the front-rear balance of the vehicle. The location of the longitudinal grooves closer to the axial center in the contact patch as in the present example can concentrate the longitudinal grooves in the middle of the contact patch. Hence, the lateral grip when the contact patch shape is small and the load is heavier in the rear will be improved, thus enhancing the stability factor on the snow. Accordingly, improvements will be made in not only the lateral grip but also the F-R balance on the snow, which will enhance overall steering stability performance on the snow.

That is, the outer longitudinal grooves 14, which are longitudinal grooves disposed in the shoulder regions, are preferably located within the contact patch width whether the tire is fitted in the front or the rear of a vehicle. And they are more preferably located in positions of 30% or more and 80% or less of the maximum contact patch width under the measurement conditions specified by JATMA for the applicable tire size (Fit the tire on an applicable rim. Apply an internal pressure of 180 kPa if the tire is for a passenger vehicle. Leave the tire standing at room temperature (15 to 30° C.) for 24 hours. Then adjust the internal pressure to the original pressure again before making the measurements. For the measurements of the contact patch shape, make the measurements under the conditions of static load radius measurements, that is, under the load of a mass equal to 88% of the maximum load capacity of the tire).

If the outer longitudinal grooves 14 are disposed in positions in excess of 80% of the maximum contact patch width, the above-mentioned improvement in lateral grip on the snow cannot be achieved. Also, if they are disposed within 30% of the maximum contact patch width, then the block width of the intermediate blocks 16*b* will be too small, thus causing a drop in block rigidity. As a result, there will be drops in the wet braking performance and wear resistance performance on paved roads. Therefore, the configuration of the central circumferential groove 12, the inner longitudinal grooves 13 provided in the central region, and the outer longitudinal grooves 14 provided in the shoulder region as in the present embodiment can realize the above-mentioned steering stability performance on the snow whether they are formed on the front tire or rear tire with varying contact patch width.

Also, it is preferable that the groove depth of the inner longitudinal grooves 13 is deeper than the groove depth of the outer longitudinal grooves 14. And it is more preferable that the groove depths are in a relationship of "lug grooves 15>inner longitudinal grooves 13>outer longitudinal grooves 14". As a result, it is possible to secure the acceleration performance on the snow by the lug grooves 15 with the deepest groove depth and also to secure a maximum lateral grip under rear load by the central circumferential groove 12 and the inner longitudinal grooves 13. Therefore, the lateral edge effect in the central region can be further augmented when the contact patch shape is small and the vehicle is under a rear load. Accordingly, the stability factor on the snow can be strengthened, which leads to improvements in both the lateral grip on the snow and the front-rear balance on the snow.

Just as described, the groove depth of the inner longitudinal grooves 13 deeper than the groove depth of the outer longitudinal grooves 14 can further strengthen the lateral edge effect in the central region such that the steering stability performance on the snow can be further improved.

Also, the groove depths are preferably such that the inner longitudinal grooves 13 are 60 to 100% and the outer longitudinal grooves 14 30 to 90% with respect to 100% of the lug grooves 15. The longitudinal grooves 13 and 14 being shallower than 30% may not cause deformation of block edges in the lateral direction on the snow. This can no longer ensure the edge effect of the longitudinal grooves 13 and 14, leading to a drop in the steering stability performance on the snow.

Also, the groove width of the inner longitudinal grooves 13 and the outer longitudinal grooves 14, which are narrow grooves, is preferably 30 t 80% of the groove depth of the lug grooves 15. If the groove width is less than 30%, then the groove walls of the narrow grooves may come in contact with each other when lateral forces work, and this will interfere with the lateral deformation of block edges on the snow. As a result, it will be difficult to ensure not only the edge effect of the longitudinal grooves but also the wet drainage performance. On the other hand, if the groove width is more than 80%, the contact patch area will be smaller, which cannot provide sufficient frictional forces on the snowy and wet road surfaces.

Also, in the present embodiment, the lug grooves 15 are each provided with a raised groove bottom portion 18, which is 10% or more and 90% or less of the sectional area (maximum depth×width of lug groove (central blocks)), on the groove bottom on the center side (central circumferential groove 12 side) of the central blocks 16a.

Provision of the raised groove bottom portion 18 further increases the rigidity of the central blocks 16a. This may prevent the collapse of the blocks and further improve the wet grip. Hence, it is possible to further improve the wet braking performance and wear resistance performance on paved roads.

It is to be noted that the sectional area of the raised groove bottom portion 18, which is less than 10% of the sectional area of the lug grooves 15, cannot adequately achieve the effect of rigidity increase. Also, the sectional area of the raised groove bottom portion 18, which is in excess of 90% of the sectional area of the lug grooves 15, may lead to the loss of groove function by the lug grooves in the central region. This will not provide sufficient snow column shear force, resulting in a marked drop in fore-aft grip on the snow.

Figure 3:
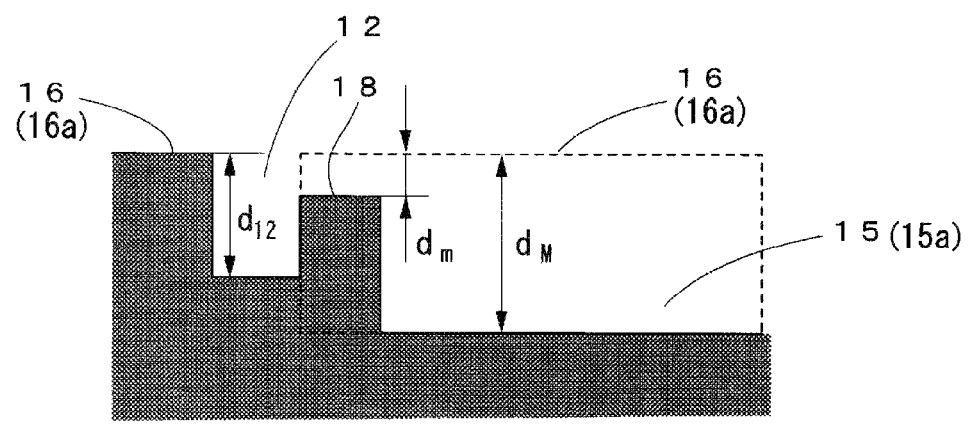
FIG. 3 is a diagram for explaining a relationship between a raised bottom portion, a central circumferential groove, and a lug groove.

As shown in FIG. 3, when the raised groove bottom portion 18 is provided, it is preferable that the groove depth $d_{12}$ of the central circumferential groove 12 is deeper than the minimum depth $d_m$ of the raised groove bottom portion 18 and less than the maximum depth $d_M$ of the lug groove 15. In this manner, the central circumferential groove 12 will be a single continuous groove, thereby enhancing the drainage performance.

Also, to enhance the drainage performance, it is desirable that the groove depth $d_{12}$ of the central circumferential groove 12 be equal to the maximum depth $d_M$ of the lug groove 15. However, to raise the wet grip by increasing the rigidity of the central blocks 16a, it is desirable that the groove depth $d_{12}$ be set shallower than the maximum depth $d_M$ of the lug groove 15. That is, it is preferable that the groove depth $d_{12}$ of the central circumferential groove 12 is 60 to 100% of the maximum depth $d_M$ of the lug groove 15.

As described above, a raised groove bottom portion 18, which is 10% or more and 90% or less of the sectional area of the lug groove 15, is provided. At the same time, the groove depth of the central circumferential groove 12 is deeper than the minimum depth of the raised groove bottom portion 18 and shallower than the maximum depth of the lug groove 15. Accordingly, the wet grip can be increased by virtue of the increased rigidity of the central blocks 16a. Also, the central circumferential groove 12 formed as a single continuous groove helps enhance the drainage performance.

Also, in the present embodiment, in order to further improve the wet braking performance and wear resistance performance, the groove wall angle on the trailing (disengaging) side of the central blocks 16a of the lug grooves 15 is set smaller than the average of the groove wall angle on the trailing side of the intermediate blocks 16b and the groove wall angle on the trailing side of the shoulder blocks 16c.

The groove wall angles provided to the lug grooves on the trailing side of the blocks are effective in raising the block rigidity in the circumferential direction of the tire. This will prevent any unnecessary deformation of the blocks, thus improving the wet grip and wear resistance performance in particular.

The groove wall angles are provided only on the trailing side of the blocks because the deformation when the blocks disengage from the contact patch is greater on the trailing side. If the groove wall angles are provided on the leading (engaging) side also, then sufficient inner volume of the lug grooves will not be secured, which will result in a marked drop in the fore-aft grip on the snow. Therefore, in order to strengthen the blocks, it is the most effective to provide the groove wall angles only on the trailing side of the blocks as in the present embodiment.

The average value of the groove wall angle of the intermediate blocks 16b and the groove wall angle of the shoulder blocks 16c is preferably 5 to 25°. If the value of the groove wall angles is smaller than 5°, the effect of strengthening the block rigidity will not be achieved almost at all. On the other hand, if it is a value greater than 25°, then a sufficient inner volume will not be secured for the lug grooves 15, which will cause a marked drop in the fore-aft grip on the snow.

Thus, the groove wall angle of the lug grooves 15 defining the central blocks 16a is made smaller than the average value of the groove wall angle of the lug grooves 15 defining the intermediate blocks 16b and the groove wall angle of the lug grooves 15 defining the shoulder blocks 16c. This can further increase the block rigidity in the circumferential direction of the tire, thereby further improving the wet grip and wear resistance performance.

Also, in the present embodiment, an R (having a curvature radius) chamfer 19 (circled portions in FIG. 1) is provided on each of the corner portions on the axially outer trailing side of the central blocks 16a and the intermediate blocks 16b. The range of curvature radius (R) is preferably 0.5 mm≤R≤5 mm. Note that the chamfer 19 may also be provided on each of the corner portions on the axially inner trailing side of the blocks.

The corners of the blocks are where the waters flowing through the lug grooves 15 and the inner longitudinal grooves 13 as well as through the lug grooves 15 and the outer longitudinal grooves 13 converge on each other. Hence, rounding of the corner portions of the blocks provides a rectifying effect on the flows, thus enhancing the wet grip.

The minimum value of the radius of the corner portions is set at 0.5 mm because the radius smaller than that cannot provide the rectification effect. And the maximum value thereof is set at 5 mm because the radius larger than that will make the blocks smaller, causing drops in block rigidity and wet grip.

Now let us call the length of the longitudinal grooves in the circumferential direction within the contact patch shape the circumferential edge length. Then it is preferable that the circumferential edge length of the central circumferential groove 12 is longer than the circumferential edge length of the outer longitudinal grooves 14. And it is more preferable that the circumferential edge length of the central circumferential groove 12 is longer than the circumferential edge length of the inner longitudinal grooves 13 and that the circumferential edge length of the inner longitudinal grooves 13 is longer than the circumferential edge length of the outer longitudinal grooves 14.

Thus, setting the circumferential edge length of the longitudinal grooves on the contact center side longer than the circumferential edge length of the longitudinal grooves on the contact edge side will further increase the lateral edge effect of the longitudinal grooves under a rear load condition where the contact patch shape is small. As a result, the lateral grip under rear load will be further enhanced, and thus the stability factor on the snow is improved. This will improve not only the lateral grip on the snow but also the front-rear balance on the snow, thereby improving the overall steering stability performance on the snow.

Also, this gets the contact shape closer to round from rectangular, so that the drainage around the contact patch and the wet steering performance will improve.

Figure 4A:
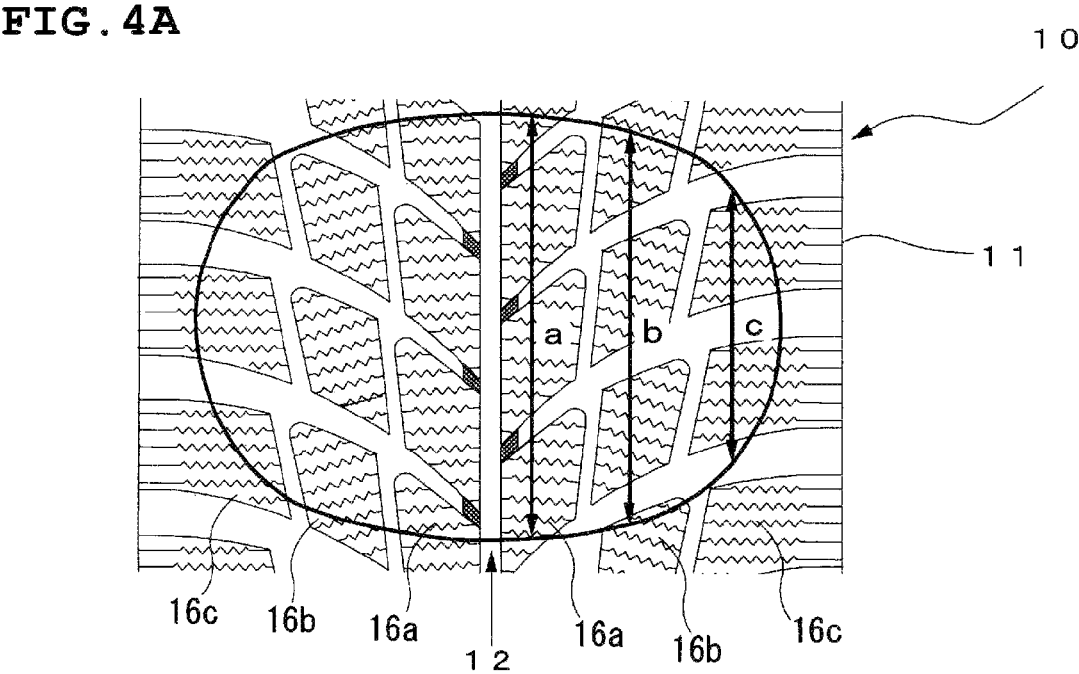
FIGS. 4A, 4B and 4C are diagrams for explaining relationships between the average contact lengths of blocks and drainage performance.

Also, as shown in FIG. 4A, it is preferable that, within the contact patch enclosed by a heavy line, the average contact length c of the shoulder blocks 16c is shorter than the average contact length b of the intermediate blocks 16b. Also, it is more preferable that the average contact length c of the shoulder blocks 16c is shorter than the average contact length b of the intermediate blocks 16b and the average contact length of the intermediate blocks 16b is shorter than the average contact length a of the central blocks 16a. As for the respective average contact lengths, it is preferable that, with respect to 100% of the average contact length a of the central blocks 16a, the average contact length b of the intermediate blocks 16b is 85 to 95% of the average contact length a and the average contact length c of the shoulder blocks 16c is 70 to 80% of the average contact length a.

Figure 4B:
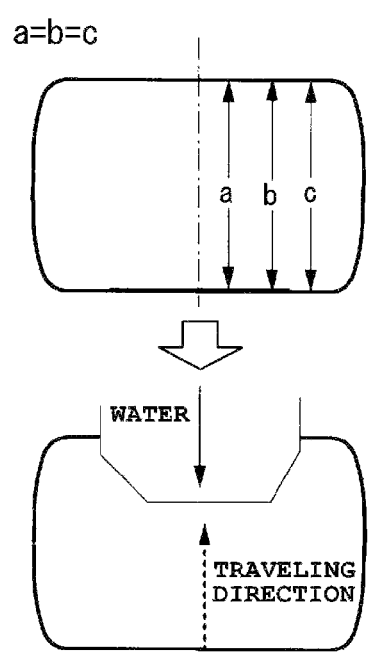
Figure 4C:
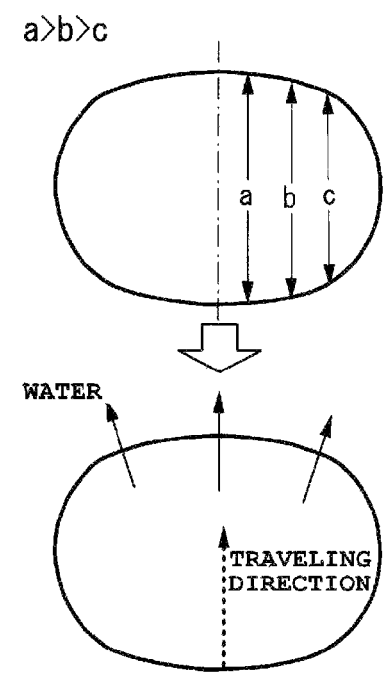

As shown in FIG. 4B, the contact shape having the same average contact lengths a, b, and c of the blocks 16a to 16c allows the entry of water easily, thus resulting in reduced drainage. In contrast to this, as shown in FIG. 4C, the contact shape of a>b>c ensures high drainage effect because the water can be easily drained axially outward. Hence, the combination of the pattern setting and the contact shape of the present invention can realize further enhanced wet braking performance.

Now a description is given of the sipes 17a to 17c provided on the ground contact side of the blocks 16a to 16c.

Here, let us call the sipe angle (angle between the extension direction of the sipes and the circumferential direction of the tire) of the central sipes 17a formed in the central blocks 16a the central sipe angle, the sipe angle of the intermediate sipes 17b formed in the intermediate blocks 16b the intermediate sipe angle, and the sipe angle of the shoulder sipes 17c formed in the shoulder blocks 16c the shoulder sipe angle. In the present embodiment, as shown in FIG. 1, the respective sipe angles are so set that the central sipe angle is smaller than the shoulder sipe angle and the intermediate sipe angle is smaller than the central sipe angle.

In other words, in the shoulder blocks 16c, the shoulder sipes 17c are oriented the closest to the axial direction of the tire. At the time of braking, the load on the front tires increases, and so the contact area of the shoulder blocks 16 increases. As a result, the sipe edge effect increases, thereby improving the braking performance on the snow.

On the other hand, in the central blocks 16 located closest to the center of contact, the central sipes 17a are oriented the next closest to the axial direction after the shoulder blocks 16c. As a result, at the time of starting, the sipe edge effect increases, thereby improving the acceleration performance on the snow.

Also, in the intermediate blocks 16b, the intermediate sipes 17b are oriented the closest to the circumferential direction of the tire. Therefore, at the time of cornering, the sipe edge effect increases, thereby improving the steering stability performance on the snow.

In this manner, the central sipe angle and the intermediate sipe angle are made smaller to increase the lateral edge components, and the shoulder sipe angle is made larger to secure the fore-aft edge components. This will improve not only the acceleration performance on the snow but also the steering stability performance on the snow.

It is to be noted that the intermediate sipe angle is preferably 45° or more and 80° or less and the shoulder sipe angle is 90° (parallel to the axial direction of the tire).

As a result, further improvement can be made on the acceleration performance on the snow and the steering stability performance on the snow.

It should be noted that the blocks provided with sipes show better grip on the snow but reduced block rigidity. Hence, there will be drops in wet grip and wear resistance performance. To prevent the drop in block rigidity, it is conceivable to provide a raised bottom reinforcement on both ends of each sipe. However, the raised bottoms, if provided at both ends of each sipe, may not allow the sipes to open when the block comes in contact with the road surface, resulting in reduced edge effect.

Figure 5A:
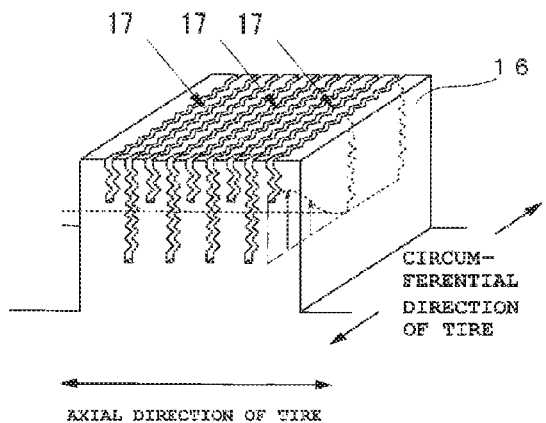
FIGS. 5A and 5B are illustrations showing 3D examples of sipes.
Figure 5B:
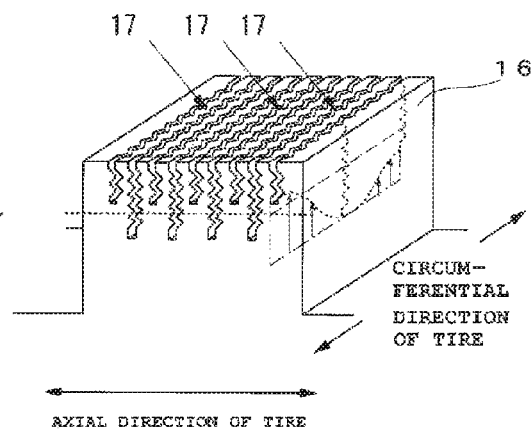

Thus, in the present embodiment, as an exemplary solution to the above-mentioned conflict between edge effect and block rigidity, a raised bottom reinforcement is given to one end only of each sipe as shown in FIG. 5A, or a raised bottom reinforcement is given as shown in FIG. 5B. Where the raised bottom reinforcements are provided on both ends of the sipes, the reinforcement heights (raised bottom heights) are to be so set as to be different from each other. In the present embodiment, the higher of the raised bottoms is 50% or more of the maximum depth of the sipes and the lower of the raised bottoms is less than 50% thereof.

Figure 6:
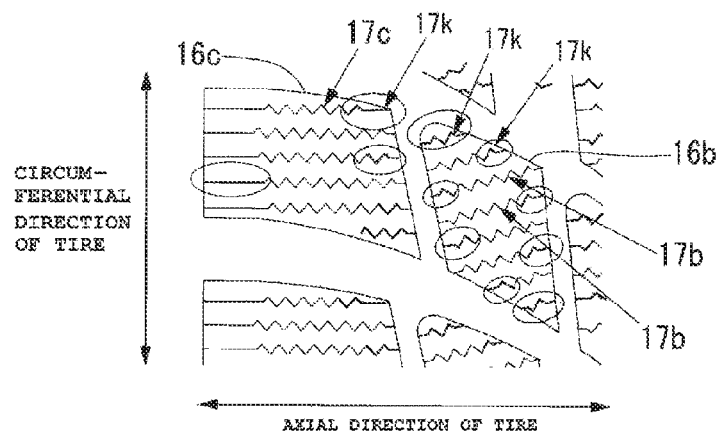
FIG. 6 is an illustration showing examples of sipe arrangements.

Also, as shown in FIG. 6, the arrangement is such that the height setting for the raised bottom reinforcements (raised bottom portions 17k) is not repeated at least three times or more in the circumferential direction for the neighboring sipes and that the setting is for 50% or more of the total number of sipes within a block.

It is to be noted that for the sipes located in positions with narrow land width, such as block end portions, a raised bottom may be provided over the entirety of the sipes to increase block rigidity.

In this manner, providing a strong reinforcement on one of the sipe ends will raise the block rigidity and have the edge effect raised on the weaker side of reinforcement. As a result, the block rigidity and the wet grip and wear resistance performance can not only be improved, but also the edge effect and grip on the snow can be secured.

Note that the higher of the raised bottoms is 50% or more of the maximum depth of the sipes because the height of less than 50% does not provide sufficient block reinforcement effect. And the lower of the raised bottoms is 50% or less of the maximum depth of the sipes because the height of over 50% does not provide sufficient edge effect.

The higher of the raised bottoms is preferably 50 to 100% and more preferably 60 to 90% of the maximum depth of the sipes. On the other hand, the lower of the raised bottoms is preferably 0 to 50% and more preferably 0 to 30% of the maximum depth of the sipes.

Also, the height setting for the raised bottoms is not repeated at least three times or more in the circumferential direction for the neighboring sipes. This is because the repetition of the same setting may create a locality in the block end having an extremely high/low rigidity. This will result in a failure to achieve the effect of the raised bottoms due to the imbalance between block reinforcement effect and edge effect. Note that it is more preferable if the same setting is not repeated two times or more.

Also, the setting of raised bottoms for both ends of the sipes is for 50% or more of the total number of sipes within a block. This is because there are cases where normally quite shallow 2D sipes are provided, for instance, in portions with narrow block width, such as block corners, or in the central region of a block to ensure block rigidity. A sufficient rigidity effect can be achieved if the raised bottom reinforcement is provided for 50% or more of the number of sipes within a block, and more preferably 70% or more of them.

Also, the sipes 17a to 17c may be 2D sipes or may be 3D sipes as shown in FIGS. 5A and 5B. Also, the sipes may be linear, wavy, or polygonal-line shaped.

The blocks provided with 3D sipes show greater block rigidity effect in both the circumferential and axial directions of the tire than the blocks with 2D sipe walls. That is, provision of 3D sipes with undulation in the depth direction in blocks can ensure high block rigidity. And by preventing unnecessary block deformation, the wet grip and wear resistance performance in particular can be improved.

The 3D sipes may be disposed more effectively in the shoulder blocks 16c which are subject to greater block deformation. Also, it is preferable to dispose 3D sipes in the intermediate blocks 16b also and more preferable to dispose them in the central blocks 16a also. The effect of disposing 3D sipes in the intermediate blocks 16b/the central blocks 16a falls short of the effect of disposing them in the shoulder blocks 16c, but provides the effect of raising the block rigidity as a whole.

By definition herein, a block having one pair or more of 3D sipes therein will be referred to as a block provided with 3D sipes.

EXAMPLES

A detailed description is given hereinbelow of the examples of the present invention:

The rim and the internal pressure were selected in compliance with the applicable rim corresponding to the size of radial ply tire and the air pressure-load capacity correspondence table as defined by JATMA YEAR BOOK (2011 Standard of Japan Automobile Tire Manufacturers Association).

The size of the trial model tire was 195/65R15. The groove depth of the lug grooves was 9 mm, and the sipe depth was all 6 mm.

Figure 7:
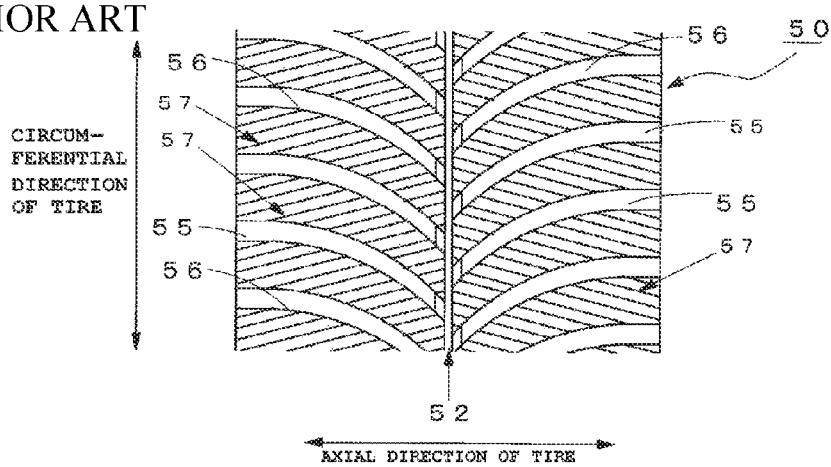
FIG. 7 is an illustration showing a tread pattern of a conventional pneumatic tire.

As shown in FIG. 7, the tread pattern of a conventional example has only the central circumferential groove 52 and the lug grooves 55 whose groove width is even in both the central region and shoulder region. And the pattern has no inner longitudinal grooves and outer longitudinal grooves, and the angle of the sipes 57 provided in the land portions 56 is all 15°. Note also that the lug groove width of the conventional example is 10 mm, and the negative rate is 32%.

The tread pattern of Examples 1 to 55 is all such that, as shown in FIG. 1, it has a central circumferential groove continuous circumferentially in the central region and the lug groove width in the shoulder region is greater than the lug groove width in the central region. Also, it has two each of narrower circumferential grooves running discontinuously approximately in the circumferential direction on the right and left side closer to the shoulder region from the central region, and the narrower circumferential grooves in the shoulder region are located within the contact patch. And the relationship between the negative rate of the lug grooves and the negative rate of the circumferential grooves is "lug groove negative circumferential groove negative".

The tread patterns of Examples 1 to 55 will be discussed later.

It is to be noted that, in the present embodiment, there are eight sipes disposed in each of the central blocks and the intermediate blocks, and the first and the eighth of them in the circumferential direction of the block are reinforced with a sipe depth of 1 mm in order to secure the block rigidity. Accordingly, it is the intermediate six sipes that may be subject to any change in sipe settings. In the shoulder blocks, which have no shallower sipes for reinforcement, all the six sipes may be subject to changes.

In the testing, the above-mentioned tire was fitted to a 6J-15 rim at an internal pressure of 200 kPa, and the wheels were fitted on a passenger vehicle before they were subjected to acceleration performance tests and steering stability performance tests on the snow and wet braking performance tests and wear resistance performance tests on the paved road.

In the acceleration performance tests on the snow, the evaluation was made by measuring the time to reach a 50 m point at full acceleration from rest state (acceleration time).

In the steering stability performance tests on the snow, the evaluation was made by measuring the lap time when the test vehicle was driven by an evaluation driver over a course for evaluation of steering stability performance on the snow. In the wet braking performance tests, the evaluation was made by spraying water to a depth of 2 mm on the paved road and measuring the braking distance of the vehicle from a speed of 60 km/h to a complete stop. In the wear resistance performance tests, the test vehicle was run 5000 km over a predetermined course of paved road, the wear volumes of tread rubber of various parts from the central region to the shoulder region of the tire were measured, and the evaluation was made by the average values of the wear volumes from the various parts (the smaller the wear volumes are, the better).

The results of the tests are shown in the tables of FIGS. 8 and 9. Note that the test results are represented by index numbers with respect to 100 for the conventional values. The larger the index numbers, the better for any of the above-cited performances.

The particulars of the tread patterns of Examples 1 to 55 are as follows:

Example 1

Negative rate (%)
Total negative rate//circumferential groove negative rate//lug groove negative rate=32//10//22
Average lug groove width (mm)
Central region lug groove width/shoulder region lug groove width=5.85/6.15 (105)

The value in parentheses is the shoulder region lug groove width (%) when the central region lug groove width is 100%.

Position of shoulder groove=60%

The position of the shoulder groove is represented by the ratio of the distance of the outer longitudinal groove from axial center to ½ of the maximum contact width.

Central raised bottom portion area/central block groove area=30%

Minimum depth of central raised bottom portions=4 mm

Circumferential groove depth (mm)

Central circumferential groove//inner longitudinal groove//outer longitudinal groove=6.5//6.5//6.5

Circumferential groove width (mm)

Central circumferential groove//inner longitudinal groove//outer longitudinal groove=4.5//4.5//4.5

Lug groove angle of central blocks=4°

Lug groove angle of intermediate and shoulder blocks=4°

Trailing corner R of central, intermediate, and shoulder blocks=None

Average contact length of blocks (relative to 100 of central blocks)

a//b//c=100//100//100

Sipe angle (°)

Central sipe angle//intermediate sipe angle//shoulder sipe angle=75//75//75

Raised sipe bottom (%)

(Maximum raised bottom/maximum sipe depth)//(minimum raised bottom/maximum sipe depth)=0//0

Maximum number of adjacent sipes with the same raised bottom=6

Number of sipes with raised bottom/total of sipes within a block (%)=0

Presence of 3D sipes

Central blocks//intermediate blocks//shoulder blocks=0//0//0

Example 2 has the same features as Example 1 except "central region lug groove width/shoulder region lug groove width=4/8 (200)". Example 3 has the same features as Example 1 except "central region lug groove width/shoulder region lug groove width=3/9 (300)". Example 4 has the same features as Example 1 except "central region lug groove width/shoulder region lug groove width=2/10 (500)". Example 5 has the same features as Example 1 except "central region lug groove width/shoulder region lug groove width=1.5/10.5 (700)".

Also, for comparison, a tire with a tread pattern featuring "central region lug groove width/shoulder region lug groove width=6/6 (100)" (Comparative Example 1) was manufactured and put to the same tests.

Example 6 has the same features as Example 3 except "position of shoulder groove=25%". Example 7 has the same features as Example 3 except "position of shoulder groove=40%". Example 8 has the same features as Example 3 except "position of shoulder groove=80%". Example 9 has the same features as Example 3 except "position of shoulder groove=85%".

Example 10 has the same features as Example 3 except that the central circumferential groove width is 5.5 mm, the inner longitudinal groove width 5.5 mm, and the outer longitudinal groove width 4.5 mm (negative rate: 32//13//19) and that the central region lug groove width and the shoulder region lug groove width are 2.7 mm and 8 mm (300). Example 11 has the same features as Example 3 except that the central circumferential groove width is 6.5 mm, the inner longitudinal groove width 6.5 mm, and the outer longitudinal groove width 4.5 mm (negative rate: 32//16//16) and that the central region lug groove width and the shoulder region lug groove width are 2.3 mm and 7 mm (300).

Also, for comparison, a tire with a tread pattern featuring "central circumferential groove width: 8 mm, inner longitudinal groove width: 8 mm, and outer longitudinal groove width: 4.5 mm (negative rate: 32//17//15)" and "central region lug groove width/shoulder region lug groove width=3/9 (300)" (Comparative Example 2) was manufactured and put to the same tests.

Example 12 has the same features as Example 3 except that "central raised bottom portion area/central block groove area" is 5%. Example 13 has the same features as Example 3 except that "central raised bottom portion area/central block groove area" is 10%. Example 14 has the same features as Example 3 except that "central raised bottom portion area/central block groove area" is 60%. Example 15 has the same features as Example 3 except that "central raised bottom portion area/central block groove area" is 90%. Example 16 has the same features as Example 3 except that "central raised bottom portion area/central block groove area" is 95%.

Example 17 has the same features as Example 3 except that "central sipe angle//intermediate sipe angle//shoulder sipe angle" are 85//75//85. Example 18 has the same features as Example 3 except that "central sipe angle//intermediate sipe angle//shoulder sipe angle" are 85//75//90.

Example 19 has the same features as Example 3 except that "average contact lengths of blocks a//b//c" are 100//100//110. Example 20 has the same features as Example 3 except that "average contact lengths of blocks a//b//c" are 100//105//90. Example 21 has the same features as Example 3 except that "average contact lengths of blocks a//b//c" are 100//95//80. Example 22 has the same features as Example 3 except that "average contact lengths of blocks a//b//c" are 100//85//70. Example 23 has the same features as Example 3 except that "average contact lengths of blocks a//b//c" are 100//80//65.

Example 24 has the same features as Example 3 except that "(maximum raised bottom/maximum sipe depth)//(minimum raised bottom/maximum sipe depth)" are 50//50 and that "number of sipes with raised bottom/total of sipes within a block" is 75%. Example 25 has the same features as Example 3 except that "(maximum raised bottom/maximum sipe depth)//(minimum raised bottom/maximum sipe depth)" are 60//40, "maximum number of adjacent sipes with the same raised bottom" is 0, and "number of sipes with raised bottom/total of sipes within a block" is 75%. Example 26 has the same features as Example 3 except that "(maximum raised bottom/maximum sipe depth)//(minimum raised bottom/maximum sipe depth)" are 80//20, "maximum number of adjacent sipes with the same raised bottom" is 0, and "number of sipes with raised bottom/total of sipes within a block" is 75%. Example 27 has the same features as Example 3 except that "(maximum raised bottom/maximum sipe depth)//(minimum raised bottom/maximum sipe depth)" are 100//0, "maximum number of adjacent sipes with the same raised bottom" is 0, and "number of sipes with raised bottom/total of sipes within a block" is 75%. Example 28 has the same features as Example 3 except that "(maximum raised bottom/maximum sipe depth)//(minimum raised bottom/maximum sipe depth)" are 80//0, "maximum number of adjacent sipes with the same raised bottom" is 0, and "number of sipes with raised bottom/total of sipes within a block" is 75%. Example 29 has the same features as Example 3 except that "(maximum raised bottom/maximum sipe depth)//(minimum raised bottom/maximum sipe depth)" are 80//0, "maximum number of adjacent sipes with the same raised bottom" is 2, and "number of sipes with raised bottom/total of sipes within a block" is 75%. Example 30 has the same features as Example 3 except that "(maximum raised bottom/maximum sipe depth)//(minimum raised bottom/maximum sipe depth)" are 80//0, "maximum number of adjacent sipes with the same raised bottom" is 3, and "number of sipes with raised bottom/total of sipes within a block" is 75%. Example 31 has the same features as Example 3 except that "(maximum raised bottom/maximum sipe depth)//(minimum raised bottom/maximum sipe depth)" are 80//0, "maximum number of adjacent sipes with the same raised bottom" is 4, and "number of sipes with raised bottom/total of sipes within a block" is 75%. Example 32 has the same features as Example 3 except that "(maximum raised bottom/maximum sipe depth)//(minimum raised bottom/maximum sipe depth)" are 80//0, "maximum number of adjacent sipes with the same raised bottom" is 0, and "number of sipes with raised bottom/total of sipes within a block" is 62.5%. Example 33 has the same features as Example 3 except that "(maximum raised bottom/maximum sipe depth)//(minimum raised bottom/maximum sipe depth)" are 80//0, "maximum number of adjacent sipes with the same raised bottom" is 0, and "number of sipes with raised bottom/total of sipes within a block" is 50%. Example 34 has the same features as Example 3 except that "(maximum raised bottom/maximum sipe depth)//(minimum raised bottom/maximum sipe depth)" are 80//0, "maximum number of adjacent sipes with the same raised bottom" is 0, and "number of sipes with raised bottom/total of sipes within a block" is 37.5%.

Example 35 has the same features as Example 3 except that "central circumferential groove depth//inner longitudinal groove depth//outer longitudinal groove depth" are 6.5//7.2//5.4. Example 36 has the same features as Example 3 except that "central circumferential groove depth//inner longitudinal groove depth//outer longitudinal groove depth" are 6.5//9.0//8.1. Example 37 has the same features as Example 3 except that "central circumferential groove depth//inner longitudinal groove depth//outer longitudinal groove depth" are 6.5//5.4//2.7. Example 38 has the same features as Example 3 except that "central circumferential groove depth//inner longitudinal groove depth//outer longitudinal groove depth" are 6.5//4.5//1.35. Example 39 has the same features as Example 3 except that "central circumferential groove depth//inner longitudinal groove depth//outer longitudinal groove depth" are 2.5//2.5//4.5. Example 40 has the same features as Example 3 except that "central circumferential groove depth//inner longitudinal groove depth//outer longitudinal groove depth" are 3.5//3.5//4.5.

Example 41 has the same features as Example 3 except that "lug groove wall angle of intermediate and shoulder blocks" is 5°. Example 42 has the same features as Example 3 except that "lug groove wall angle of intermediate and shoulder blocks" is 15°. Example 43 has the same features as Example 3 except that "lug groove wall angle of intermediate and shoulder blocks" is 25°. Example 44 has the same features as Example 3 except that "lug groove wall angle of intermediate and shoulder blocks" is 30°.

Example 45 has the same features as Example 3 except that "trailing corner R of central, intermediate, and shoulder blocks" is 0.3 mm. Example 46 has the same features as Example 3 except that "trailing corner R of central, intermediate, and shoulder blocks" is 0.5 mm. Example 47 has the same features as Example 3 except that "trailing corner R of central, intermediate, and shoulder blocks" is 2.5 mm. Example 48 has the same features as Example 3 except that "trailing corner R of central, intermediate, and shoulder blocks" is 5 mm. Example 49 has the same features as Example 3 except that "trailing corner R of central, intermediate, and shoulder blocks" is 6 mm.

Example 50 has the same features as Example 3 except that 3D sipes are disposed in the shoulder blocks. Example 51 has the same features as Example 3 except that 3D sipes are disposed in the shoulder blocks and the intermediate blocks. Example 52 has the same features as Example 3 except that 3D sipes are disposed in all blocks.

Example 53 has the same features as Example 3 except that the central circumferential groove depth is 3.6 mm. Example 54 has the same features as Example 3 except that the central circumferential groove depth is 5.4 mm. Example 55 has the same features as Example 3 except that the central circumferential groove depth is 9.0 mm.

As is evident from the tables of FIGS. 7 and 8, it has been confirmed that the tires of Examples 1 to 5 featuring greater lug groove widths in the central region than the lug groove widths in the shoulder region show improvements in all of acceleration performance on the snow, steering stability performance on the snow, wet braking performance, and wear resistance performance on those of the example of a conventional tire. It is to be noted that the greater the lug groove width in the shoulder region than the lug groove width in the central region, the higher the acceleration performance on the snow and the stability performance on the snow. And as for the wet braking performance, Example 3 with the lug groove width in the shoulder region being 300% of the lug groove width in the central region shows the highest evaluation. Also, the sample having the same groove width in both the shoulder and the central region shows improved acceleration performance on the snow and stability performance on the snow, but no significant difference in wet braking performance and wear resistance performance from the conventional example. Therefore, as for the size of the lug groove width in the shoulder region in relation to the lug groove width in the central region, it is considered preferable that the lug groove width in the shoulder region is in a range of 105 to 500% of the lug groove width in the central region.

Also, as evidenced by Example 3 and Examples 6 to 9, it has been confirmed that the position of the shoulder groove should preferably be within a range of 25% to 85% of the distance from the axial center of the tire to ½ of the maximum contact width.

Also, as can be understood by comparing Examples 3, 10, and 11 against Comparative Example 2, all of the acceleration performance on the snow, the stability performance on the snow, the wet braking performance, and the wear resistance performance improve on those of Conventional Example when the relationship between the lug groove negative rate and the circumferential groove negative rate is "lug groove negative rate≥circumferential groove negative rate". However, as with Comparative Example 2, of which the lug groove negative rate is lower than the circumferential groove negative rate, it has been confirmed that there is not much improvement of the above-mentioned performances on those of the conventional example even when a central circumferential groove and four narrower circumferential grooves are provided and the lug groove width in the shoulder region is made greater than the lug groove width in the central region.

Also, as with Examples 12 to 16, which are each provided with a central raised bottom portion, it has been confirmed that the acceleration performance and stability performance on the snow or the wet braking performance and wear resistance performance show improvements.

Also, as can be understood by comparing Example 3 against Examples 17 and 18, it has been confirmed that the acceleration performance on the snow and the steering stability performance on the snow show further improvements when the measures of the sipe angle are so set as "shoulder sipe angle>central sipe angle>intermediate sipe angle".

Also, as can be understood by comparing Examples 19 to 23 against Example 3, it has been confirmed that the wet braking performance shows further improvement when the average contact length b of intermediate blocks is set greater than the average contact length c of shoulder blocks.

Also, as evidenced by Examples 24 to 34, it has been confirmed that the wet braking performance and wear resistance performance show further improvements when the sipes are provided with a raised bottom portion at both ends thereof.

Also, as evidenced by Examples 35 to 40, it has been confirmed that the steering stability performance on the snow can be secured if the depth of the inner longitudinal groove is set deeper than the depth of the outer longitudinal groove. As evidenced by Examples 41 to 44, it has been confirmed that the wet braking performance and wear resistance performance show further improvements if angles are given to the groove walls of the lug grooves in the intermediate blocks and the shoulder blocks. And, as evidenced by Examples 45 to 49, it has been confirmed that the wet braking performance and wear resistance performance show further improvements if a chamfering R is given to the trailing corners of the central, intermediate, and shoulder blocks.

Also, as evidenced by Examples 50 to 52, it has been confirmed that the wet braking performance and wear resistance performance show further improvements if 3D sipes are disposed in the blocks.

It is to be noted that, as evidenced by Examples 3 and 53 to 55, the groove depth of the central circumferential groove should be 40 to 100% of the depth of the lug grooves.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

DESCRIPTION OF REFERENCE NUMERALS 10 pneumatic tire
11 tread
12 central circumferential groove
13, 13a, 13b inner longitudinal groove
14, 14a, 14b outer longitudinal groove
15 lug groove
15a right-side lug groove
15b left-side lug groove
16a central block
16b intermediate block
16c shoulder block
17a central sipe
17b intermediate sipe
17c shoulder sipe
18 raised bottom portion
19 chamfer

The invention claimed is:

1. A pneumatic tire comprising a tread, the tread having, in a surface thereof,
    lug grooves on one side extending from one axial edge toward an axial center of the tire in such a manner as to intersect with a circumferential direction of the tire and lug grooves on the other side extending in a symmetrically opposite direction from the axial center toward the other axial edge of the tire;
    a central circumferential groove located at contact width center of the tire and extending circumferentially therearound;
    a plurality of longitudinal grooves disposed axially outside of the central circumferential groove and within a contact patch of the tire;
    a plurality of land portions defined by the central circumferential groove, the longitudinal grooves, and the lug grooves or by the longitudinal grooves and the lug grooves; and
    a plurality of sipes disposed in the land portions,
    wherein the width of each of the lug grooves in shoulder regions is greater than the width thereof in a central region, the central region being a region enclosed by two straight parallel lines each passing through a center between contact width center and contact edge of the tire and the shoulder regions being regions axially outside of the central region,
    wherein the sum of groove area of the central circumferential groove and groove area of the longitudinal grooves is smaller than the groove area of the lug grooves,
    wherein the plurality of longitudinal grooves consist of inner longitudinal grooves each disposed axially outside of the central circumferential groove and outer longitudinal grooves each disposed axially outside of the inner longitudinal groove, and
    wherein a central sipe angle, which is an angle between an extension direction of sipes formed in central blocks and a circumferential direction of the tire, is smaller than a shoulder sipe angle, which is an angle between an extension direction of sipes formed in shoulder blocks and the circumferential direction of the tire, and an intermediate sipe angle, which is an angle between an extension direction of sipes formed in intermediate blocks and the circumferential direction of the tire, is smaller than the central sipe angle, the central blocks being blocks disposed in a central portion of the tire and defined by the central circumferential groove, the inner longitudinal grooves, and the lug grooves, the shoulder blocks being blocks disposed in the shoulder region of the tire and defined by the outer longitudinal grooves and the lug grooves, and the intermediate blocks being blocks disposed between the central blocks and the shoulder blocks and defined by the inner longitudinal grooves, the outer longitudinal grooves, and the lug grooves.

2. The pneumatic tire according to claim 1,
    wherein the groove depth of the inner longitudinal grooves is formed deeper than the groove depth of the outer longitudinal grooves, the central blocks being blocks disposed in a central portion of the tire and defined by the central circumferential groove, the inner longitudinal grooves, and the lug grooves, the shoulder blocks being blocks disposed in the shoulder region of the tire and defined by the outer longitudinal grooves and the lug grooves, and the intermediate blocks being blocks disposed between the central blocks and the shoulder blocks and defined by the inner longitudinal grooves, the outer longitudinal grooves, and the lug grooves.

3. The pneumatic tire according to claim 1,
wherein a circumferential edge length of the central circumferential groove is longer than a circumferential edge length of the inner longitudinal grooves, and a circumferential edge length of the inner longitudinal grooves is longer than a circumferential edge length of the outer longitudinal grooves, the central blocks being blocks disposed in a central portion of the tire and defined by the central circumferential groove, the inner longitudinal grooves, and the lug grooves, the shoulder blocks being blocks disposed in the shoulder region of the tire and defined by the outer longitudinal grooves and the lug grooves, and the intermediate blocks being blocks disposed between the central blocks and the shoulder blocks and defined by the inner longitudinal grooves, the outer longitudinal grooves, and the lug grooves
the circumferential edge length being a circumferential length of the longitudinal grooves within the contact patch region.

4. A pneumatic tire comprising a tread, the tread having, in a surface thereof,
lug grooves on one side extending from one axial edge toward an axial center of the tire in such a manner as to intersect with a circumferential direction of the tire and lug grooves on the other side extending in a symmetrically opposite direction from the axial center toward the other axial edge of the tire;
a central circumferential groove located at contact width center of the tire and extending circumferentially therearound;
a plurality of longitudinal grooves disposed axially outside of the central circumferential groove and within a contact patch of the tire;
a plurality of land portions defined by the central circumferential groove, the longitudinal grooves, and the lug grooves or by the longitudinal grooves and the lug grooves; and
a plurality of sipes disposed in the land portions,
wherein the width of each of the lug grooves in shoulder regions is greater than the width thereof in a central region, the central region being a region enclosed by two straight parallel lines each passing through a center between contact width center and contact edge of the tire and the shoulder regions being regions axially outside of the central region,
wherein the sum of groove area of the central circumferential groove and groove area of the longitudinal grooves is smaller than the groove area of the lug grooves,
wherein the plurality of longitudinal grooves consist of inner longitudinal grooves, each formed axially outside of the central circumferential groove, and outer longitudinal grooves, each formed axially outside of the inner longitudinal groove,
wherein the width of each of the lug grooves defining central blocks is smaller than the width thereof defining shoulder blocks, the central blocks being blocks disposed in a central portion of the tire and defined by the central circumferential groove, the inner longitudinal grooves, and the lug grooves, the shoulder blocks being blocks disposed in the shoulder region of the tire and defined by the outer longitudinal grooves and the lug grooves, and intermediate blocks being blocks disposed between the central blocks and the shoulder blocks and defined by the inner longitudinal grooves, the outer longitudinal grooves, and the lug grooves,
wherein a groove bottom on axial center side of each of the lug grooves defining the central blocks has a raised bottom portion whose cross-sectional area is 10% or more and 90% or less of the cross-sectional area of the lug groove, and
wherein a central sipe angle, which is an angle between an extension direction of sipes formed in the central blocks and the circumferential direction of the tire, is smaller than a shoulder sipe angle, which is an angle between an extension direction of sipes formed in the shoulder blocks and the circumferential direction of the tire, and an intermediate sipe angle, which is an angle between an extension direction of sipes formed in the intermediate blocks and the circumferential direction of the tire, is smaller than the central sipe angle.

5. The pneumatic tire according to claim 4, wherein the intermediate sipe angle is 45° or more and 80° or less and the shoulder sipe angle is 90°.

6. The pneumatic tire according to claim 4, wherein an average contact length of a position where the intermediate blocks are located within the contact patch of the tire is greater than an average contact length of a position where the shoulder blocks are located.

7. The pneumatic tire according to claim 4, wherein 50% or more of the sipes formed in the respective blocks have each a raised bottom portion located at least on one axial end side thereof, a depth of the raised bottom portion being shallower than a middle portion thereof,
wherein for sipes having a raised bottom portion on both axial end sides, the depth of the one end of the sipes is 50% or less of the depth at the middle portion thereof and the depth at the other end is 50% or more of the depth at the middle portion thereof, and
wherein in at least some of the respective blocks, one or both of the depths at one end of the circumferentially neighboring sipes and the depths at the other end of the circumferentially neighboring sipes are different from each other.

8. The pneumatic tire according to claim 4, wherein the groove depth of the central circumferential groove is formed deeper than the groove depth of the inner longitudinal grooves, and the groove depth of the inner longitudinal grooves is formed deeper than the groove depth of the outer longitudinal grooves.

9. The pneumatic tire according to claim 4, wherein the groove wall angle of the lug grooves defining the central blocks is smaller than the average of the groove wall angle of the lug grooves defining the intermediate blocks and the groove wall angle of the lug grooves defining the shoulder blocks.

10. The pneumatic tire according to claim 4, wherein an R chamfering within a curvature radius range of 0.5 mm≤R≤5 mm is given to each of the corner portions on the trailing side of the central blocks and the corner portions on the trailing side of the intermediate blocks.

11. The pneumatic tire according to claim 4, wherein the sipes formed in the shoulder blocks are 3D sipes.

12. The pneumatic tire according to claim 4, wherein each of the lug grooves defining the central blocks has a raised groove bottom portion on the groove bottom on the axial center side thereof, the cross-sectional area of the raised groove bottom portion being 10% or more and 90% or less of the cross-sectional area of the lug groove, and the groove depth of the central circumferential groove is deeper than the minimum depth of the raised groove bottom portion and shallower than the maximum groove depth of the lug grooves.

* * * * *